United States Patent
Alamdari Sajadi et al.

(10) Patent No.: US 12,397,787 B2
(45) Date of Patent: Aug. 26, 2025

(54) METHODS AND SYSTEMS FOR LATERAL CONTROL OF A VEHICLE

(71) Applicant: Aptiv Technologies AG, Schaffhausen (CH)

(72) Inventors: Seyed Amin Alamdari Sajadi, Wuppertal (DE); Anand Vijay Kumar, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 140 days.

(21) Appl. No.: 18/162,146

(22) Filed: Jan. 31, 2023

(65) Prior Publication Data

US 2023/0242110 A1 Aug. 3, 2023

(30) Foreign Application Priority Data

Feb. 2, 2022 (EP) .................................... 22154830

(51) Int. Cl.
*B60W 30/12* (2020.01)
*B60W 50/00* (2006.01)
*B62D 15/02* (2006.01)

(52) U.S. Cl.
CPC ........ *B60W 30/12* (2013.01); *B60W 50/0097* (2013.01); *B60W 2420/403* (2013.01); *B60W 2510/20* (2013.01); *B60W 2520/125* (2013.01); *B60W 2552/00* (2020.02)

(58) Field of Classification Search
CPC ............. B60W 30/12; B60W 50/0097; B60W 2420/403; B60W 2510/20; B60W 2520/125; B60W 2552/00
See application file for complete search history.

(56) References Cited

U.S. PATENT DOCUMENTS

| | | | |
|---|---|---|---|
| 9,308,932 B2 * | 4/2016 | Kaufmann | B62D 1/28 |
| 2017/0253241 A1 | 9/2017 | Filev et al. | |
| 2019/0155229 A1 | 5/2019 | Herrera | |
| 2020/0148261 A1 | 5/2020 | Varunjikar et al. | |
| 2021/0086832 A1 | 3/2021 | Moshchuk et al. | |
| 2021/0139007 A1 | 5/2021 | Lodewijk | |
| 2021/0291862 A1 * | 9/2021 | Jiang | B60W 50/0098 |
| 2023/0089978 A1 * | 3/2023 | Pulver | G05D 1/0238 |
| | | | 701/26 |

(Continued)

FOREIGN PATENT DOCUMENTS

| | | |
|---|---|---|
| CN | 107697155 | 2/2018 |
| CN | 110027547 | 7/2019 |

(Continued)

OTHER PUBLICATIONS

"Extended European Search Report", EP Application No. 22154830. 8, Jul. 22, 2022, 8 pages.

*Primary Examiner* — Dale Moyer
(74) *Attorney, Agent, or Firm* — Harness, Dickey & Pierce, P.L.C.

(57) ABSTRACT

Aspects of a computer implemented method for lateral control of a vehicle include the following operations carried out by computer hardware components: determining a reference steering angle for the vehicle; determining at least one control variable based on a model predictive controller using the reference steering angle; and laterally controlling the vehicle based on the at least one control variable.

8 Claims, 6 Drawing Sheets

(56) References Cited

U.S. PATENT DOCUMENTS

2024/0317208 A1 * 9/2024 Davins ................ B62D 15/021

FOREIGN PATENT DOCUMENTS

| CN | 111731307 | | 10/2020 | | |
|---|---|---|---|---|---|
| CN | 113511188 | | 10/2021 | | |
| DE | 102016123594 | | 6/2017 | | |
| DE | 102017106684 | | 10/2017 | | |
| DE | 102019205405 | | 10/2020 | | |
| KR | 20200081524 | A * | 7/2020 | .......... | B60W 40/107 |

* cited by examiner

METHODS AND SYSTEMS FOR LATERAL CONTROL OF A VEHICLE

INCORPORATION BY REFERENCE

This application claims priority to European Patent Application Number EP22154830.8, filed Feb. 2, 2022, the disclosure of which is incorporated by reference in its entirety.

BACKGROUND

Side collision warning systems in a vehicle warn the driver when a side collision with a detected object, for example another vehicle or a barrier, is imminent. This is done by calculating the lateral distance between the detected object and the host vehicle and also to estimate the time to collision between the host vehicle and the detected object. If any of these two variables is below a corresponding threshold, the system outputs a side collision warning.

Side collision may occur due to the unintentional deviation of the vehicle from a road lane center.

Accordingly, there is a need for efficient and reliable lateral control of the vehicle.

SUMMARY

The present disclosure provides computer implemented methods, computer systems, and non-transitory computer readable mediums, including those described in the claims. Embodiments are given in the claims, the description, and the drawings.

In one aspect, the present disclosure is directed at a computer implemented method for lateral control of a vehicle, the method comprising the following steps (operations) performed (in other words: carried out) by computer hardware components: determining a reference steering angle for the vehicle; determining at least one control variable based on a model predictive controller using the reference steering angle; and laterally controlling the vehicle based on the at least one control variable.

In other words, a lateral control method in a vehicle is provided to perform lane centering and merge to the center of the lane safely and comfortably.

It has been found that using the reference steering angle in a model predictive controller to determine a control variable enhances that control of the vehicle.

The vehicle may be a car, a truck, a lorry, a bus, a motorbike, a powered bicycle, or any other wheeled vehicle that may be steered (in other words: for which a direction of motion may be controlled by steering at least one of the wheels of the vehicle).

The at least one control variable may include a plurality of variables or input data that may be used for actually controlling the vehicle.

According to an embodiment, the reference steering angle is based on a wheel base of the vehicle. Using the wheel base to determine the reference steering angle may provide an accurate determination of the reference steering angle.

According to an embodiment, the reference steering angle is based on a curvature of a road on which the vehicle is driving. Using the curvature of the road may enable a precise determination of the reference steering angle.

According to an embodiment, the reference steering angle is based on a product of a wheel base of the vehicle and a curvature of a road on which the vehicle is driving.

According to an embodiment, the reference steering angle is based on an understeer gradient. The understeer gradient may compensate for understeering in a vehicle. Thus, the understeer gradient may be used to enhance accuracy of the reference steering angle.

According to an embodiment, the understeer gradient is a constant for the vehicle. The method according to various embodiments may thus be configured to store the understeer gradient of the vehicle that is to be controlled laterally, and may use the vehicle specific understeer gradient.

According to an embodiment, the reference steering angle is based on a lateral acceleration of the vehicle. It has been found that the lateral acceleration affects the reference steering angle.

According to an embodiment, the reference steering angle is based on a product of an understeer gradient and a lateral acceleration of the vehicle.

According to an embodiment, the reference steering angle is based on sum of a first product and a second product, wherein the first product is a product of a wheel base of the vehicle and a curvature of a road on which the vehicle is driving, and wherein the second product is a product of an understeer gradient and a lateral acceleration of the vehicle.

According to an embodiment, the reference steering angle is based on equation (3).

According to an embodiment, the model predictive controller is based on a cost function which is based on the reference steering angle and the at least one control variable, for example based on a difference between the reference steering angle and the determined steering angle for steering the vehicle.

In another aspect, the present disclosure is directed at a computer system, said computer system comprising a plurality of computer hardware components configured to carry out several or all steps of the computer implemented method described herein. The computer system can be part of a vehicle.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle comprising the computer system as described herein, a sensor configured to determine an actual steering angle and an actuator configured to steer the vehicle based on the at least one control variable and the actual steering angle.

According to an embodiment, the sensor comprises at least one of an angular sensor, a camera, a gyroscope, or an accelerometer.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

With the methods and devices according to various aspects and embodiments, a technique for providing an optimized steering wheel angle, for example for lateral control (for example lane centering and lane change) applications, utilizing a cost function approach modified with a steering reference term to the model predictive controller may be provided. A reference steering value for Model predictive control cost function may be provided.

BRIEF DESCRIPTION OF THE DRAWINGS

Example embodiments and functions of the present disclosure are described herein in conjunction with the following drawings, showing schematically.

DETAILED DESCRIPTION

In aspects, the present disclosure relates to methods and systems for lateral control of a vehicle, in particular to using at least one control variable, which is determined using a reference steering angle, for laterally controlling the vehicle.

According to various embodiments, devices and methods for providing an optimized steering wheel angle, for example for lateral control (for example lane centering and lane change) applications, utilizing modified functions for the model predictive controller may be provided.

A (mathematical) cost function and a stable system dynamics needs to be derived in order to design the model predictive controller which minimize the cost and provide an optimal solution to control the vehicle laterally. The cost function may include (or consist of) a term that minimizes the control effort to perform an operation. With regard to this, a reference value for the steering wheel angle may be provided according to various embodiments. This reference value of steering may be based on the understeer gradient of the vehicle.

Figure 1:
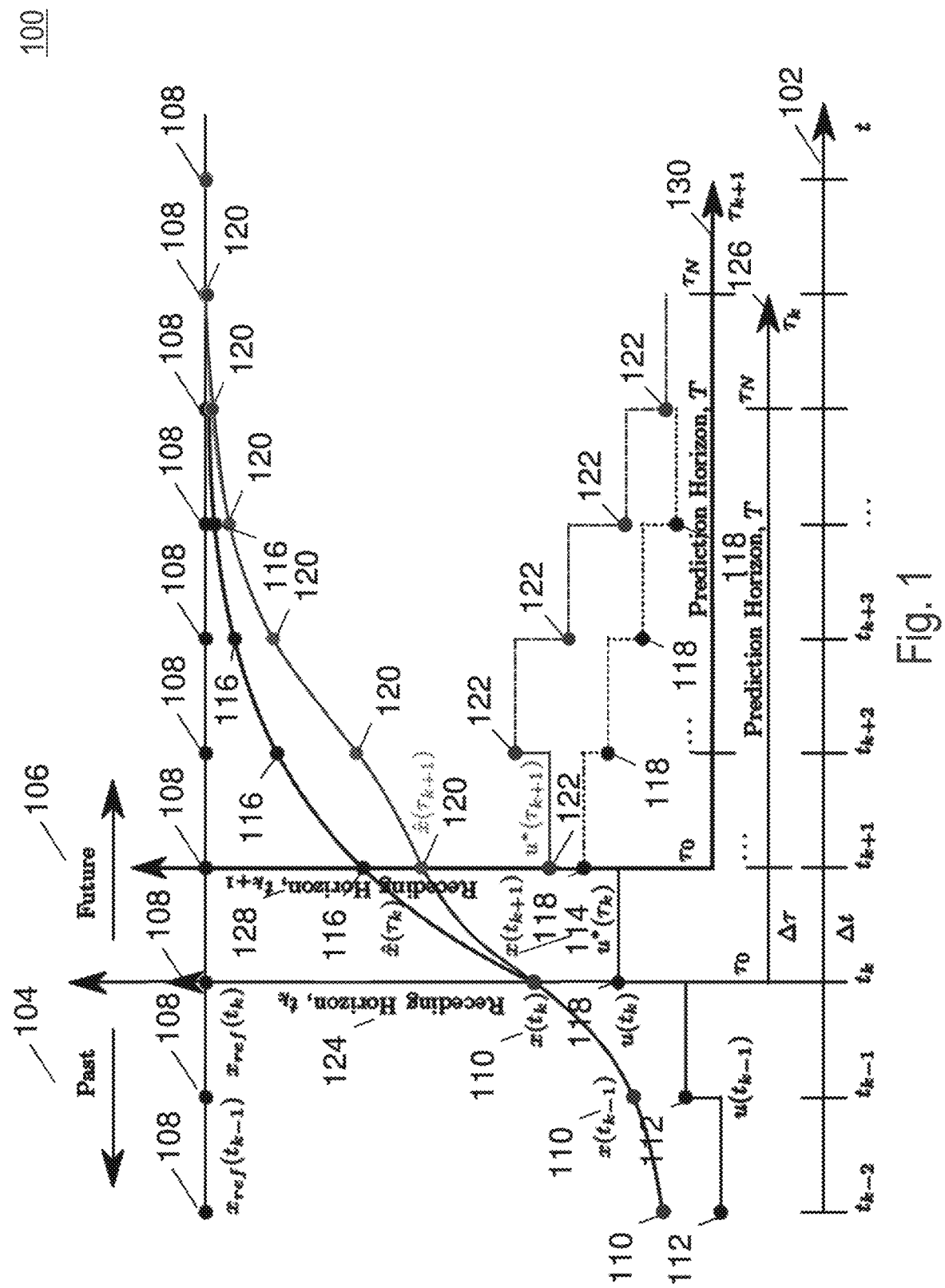
FIG. 1 a model predictive controller according to various embodiments.

FIG. 1 shows an illustration 100 of a model predictive controller.

Model predictive controller may be a powerful controller. As the name indicates, the controller may predict the state of the vehicle, for example the lateral offset from reference and orientation error w.r.t reference of vehicle for a finite Horizon time (T). The reference value for the vehicle may be calculated by a planning block, and then this value may be introduced to a Model Predictive Control (MPC), such that it compensates the error by generating a control signal at the current time instance.

In FIG. 1, a time axis 102 (with past time 104 and future time 106), the desired set-point 108, measured states 110, closed-loop input 112, re-measured state 114, predicted states 116, optimal input trajectory 118, re-predicted state 120, and re-optimal input trajectory 122 are illustrated. A receding horizon $(t_k)$ 124 and a corresponding prediction horizon (T) 126 are shown. A receding horizon $(t_{k+1})$ 128 and a corresponding prediction horizon (T) 130 are shown.

The following symbols may be used:
$t_k$—Current time step;
t—time axis forward in time;
T—Prediction horizon (duration of prediction of states);
$\Delta t$—Sampling period;
$u^*(\tau_k)$—Optimal control value at the current time step;
$x_{ref}(t_k)$—reference trajectory for states;
$\hat{x}(\tau)$—Predicted states.

The cost function according to various embodiments may be used by the optimizer in the model predictive controller to provide the optimal control value at the current time step. In this case, the steering angle may be the optimal control signal sequence ($u^*$) that is used to actuate the vehicle in order to minimize error of orientation and lateral offset (states of the system). Based on the system dynamics and the cost functions designed, the predictions of trajectory may also be calculated. The obtained control sequence may be the motion control sequence that can be applied to the vehicle.

One approach may minimize the error in state and reference value and also minimize the control effort required to do so by introducing these terms in the following cost function J:

$$J=\int_0^T (x-x_{ref})^2 * k_g + u^2 * k_u \qquad (1)$$

In formula (1):
J represents the cost function that needs to be minimized,
x represents the vehicle state (for example the cross tracking error),
$x_{ref}$ represents the reference value of the state whose error is to be minimized (for example lane center),
$k_g$ represents the tuning gain on minimizing the error between state and reference value,
u represents the control input (for example the steering input), and
$k_u$ represents the tuning gain on minimizing the control input effort.

For a specific example of minimizing the cross tracking error of the vehicle w.r.t a reference and the corresponding steering angle, the following simple cost function J may be used:

$$J=\int_0^T (d-d_{ref})^2 * k_d + \delta^2 * k_\delta \qquad (2)$$

In formula (2):
J represents the cost function that needs to be minimized,
d represents the initial value of the lateral offset obtained from vehicle sensor input,
$d_{ref}$ represents the reference value that vehicle should track, for example the lane center,
$k_d$ represents the tuning gain on minimizing the cross tracking error,
$\delta$ represents the steering angle or the control input, and
$k_\delta$ represents the tuning gain on minimizing the control input.

A drawback of such a cost may be that the cross tracking error in a curve cannot be compensated at the same time as keeping the steering at 0, which is how the cost function in equation 1 is formulated. This may cause contradicting behavior in the evaluation of the cost and therefore the steering command generated from the MPC may be suboptimum set leading to poor tracking of the reference line. This may become more evident in curves, where a certain steering angle is required to negotiate the curve but the cost would try to keep the steering angle as zero as possible while trying to take the curve and minimize the cross tracking error, depending on how the error terms are formulated.

According to various embodiments, instead of having the feedforward term, a steering reference term may be introduced in the cost function itself. Therefore, the steering angle required for steady state cornering may already be formulated mathematically into the cost function. Therefore, the MPC may be well informed already about having to negotiate a curve and may generate a steering angle appropriately instead of holding the steering at 0 while negotiating a curve.

According to various embodiments, the steering reference is given by the following equation (3):

$$\delta_{ref} = L^* \kappa + K_v^* a_y \quad (3)$$

In equation (3):
$\delta_{ref}$ represents the steering value required for steady state cornering,
L represents vehicle wheel base,
κ represents the curvature of the road,
$K_v$ is the understeer gradient, which may be a constant for a given vehicle, and
$a_y$ represents the lateral acceleration of the vehicle.

According to various embodiments, the following cost function J may be provided:

$$J = \int_0^T (d - d_{ref})^2 * k_d + (\delta - \delta_{ref})^2 * k_\delta \quad (4)$$

In equation (4):
J represents the cost function that needs to be minimized,
d represents the initial value of the lateral offset obtained from vehicle sensor input,
$d_{ref}$ represents the reference value that vehicle should track, for example the lane center,
$k_d$ represents the tuning gain on minimizing the cross tracking error,
δ represents the steering angle,
$\delta_{ref}$ represents the reference steering angle (for example according to equation (3)), and
$k_\delta$ represents the tuning gain on minimizing the steering error.

By having a cost function like in equation (4), the MPC may already generate a steering that is required to negotiate a curve rather than trying to negotiate a curve while to trying to keep the steering as zero as possible. In this way, the cost function may be more mathematically balanced and contradictory terms may be avoided.

The determined steering angle may be referred to as control variable. For example a time sequence of steering angles (which may be the control variable) may be used to steer the vehicle for lateral control.

In the following, graphs and plots showing the comparison between the steering performance of the cost function according to equations (1) and (2) and the cost function according to equation (3) and (4) are shown. The use case for the plots below is to have a lane change like behavior where the required lateral offset from an initial offset is approximately the lane width (3.5 m in this case).

Figure 2:
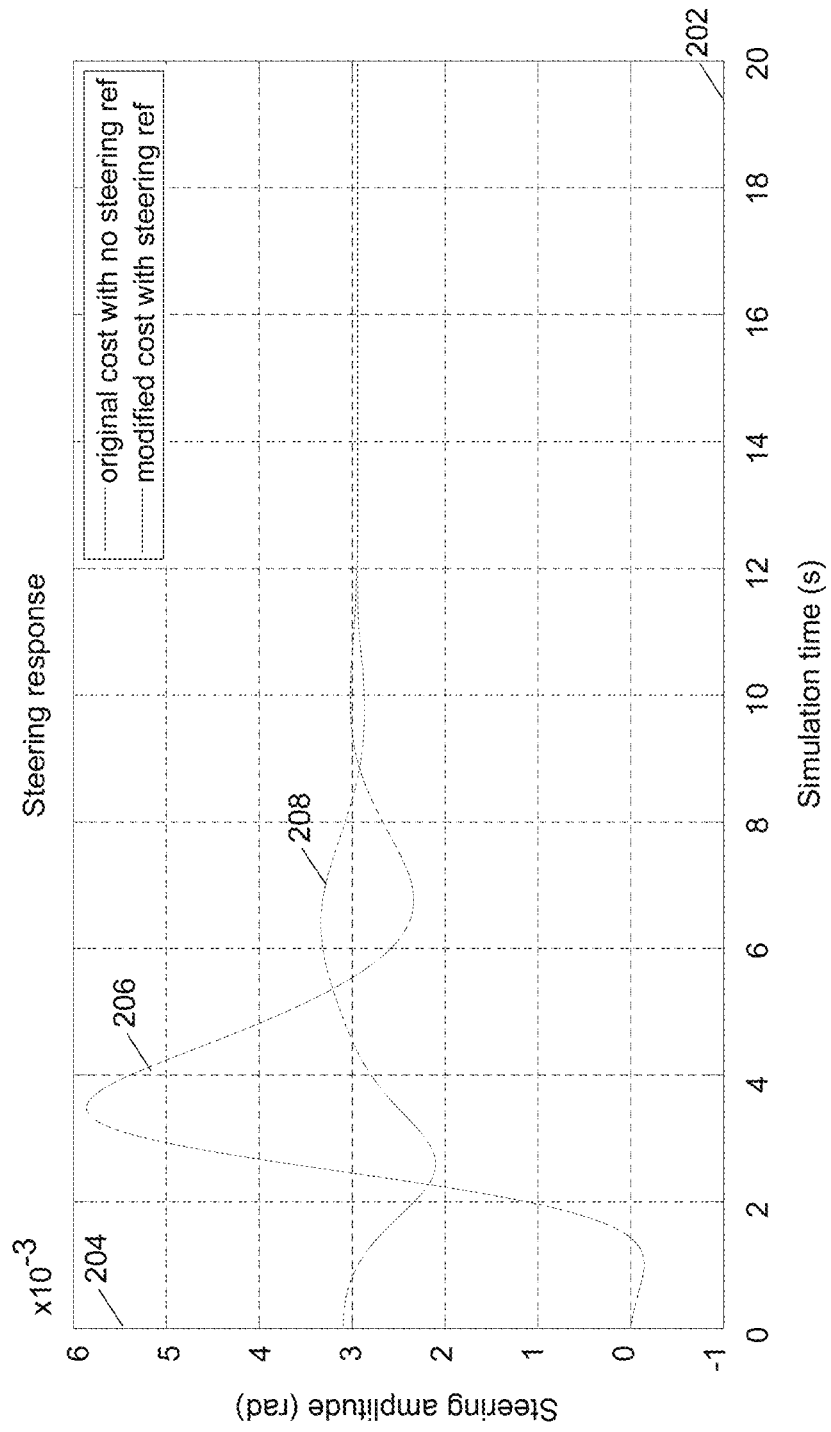
FIG. 2 a steering response comparison between different cost functions.

FIG. 2 shows an illustration 200 of how the steering response has a much smoother rise and also significantly lower amplitude for the same maneuver. This in practical test would result in a comfortable lane change for the passenger. A horizontal axis 202 indicates time, and a vertical axis 204 indicates the steering angle. Curve 206 results from using the cost function of equations (1) and (2), and curve 208 results from using the cost function of equations (3) and (4).

Figure 3:
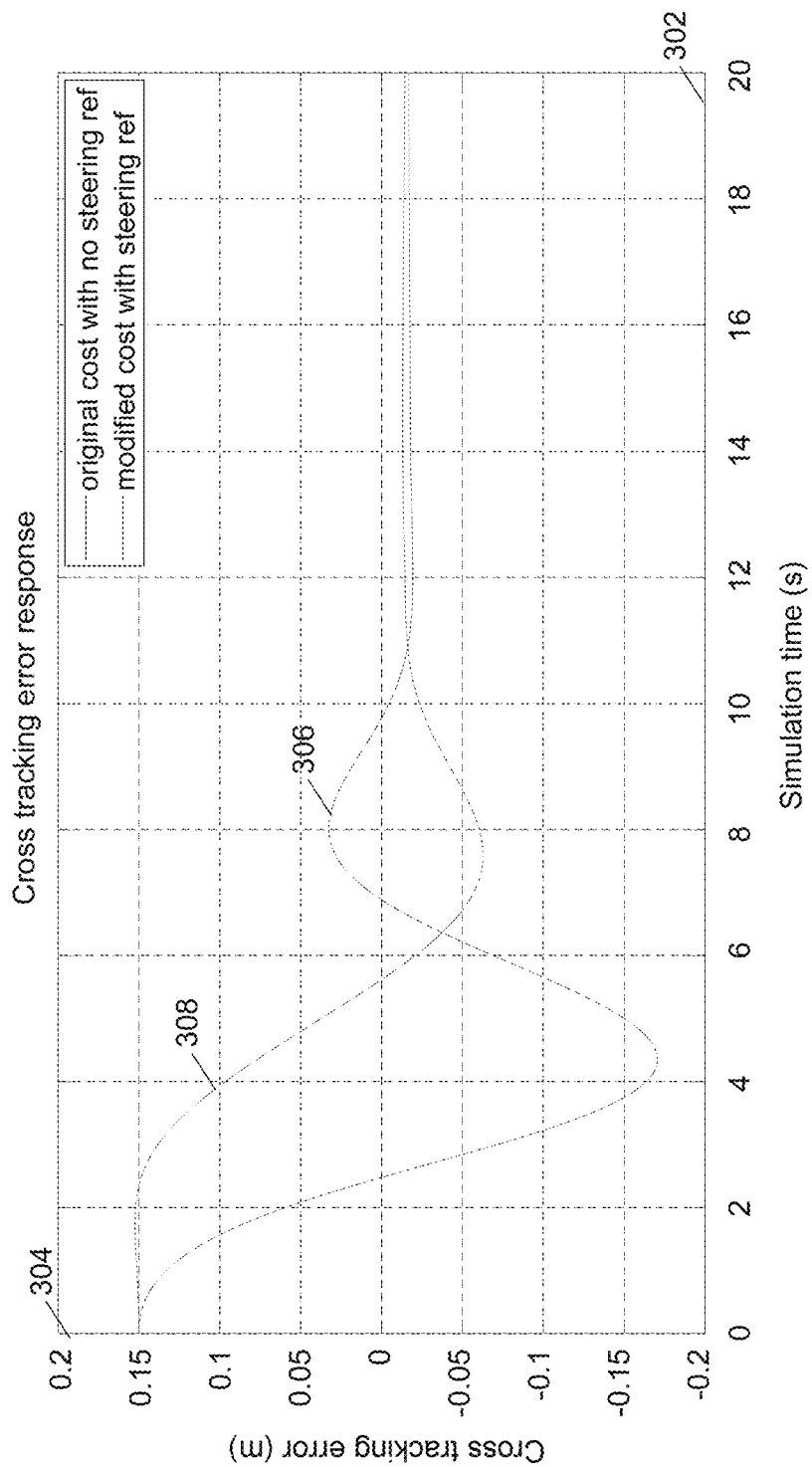
FIG. 3 a cross tracking error comparison between different cost functions.

FIG. 3 shows an illustration 300 of the comparison between the lateral offset for both cases and how the modified cost (function) according to equations (2) and (3) makes the rate of lateral offset smaller than the conventional, again resulting in a smoother maneuver. Also, a difference could be noted in the overshoots between the plots suggesting that the cost according to equations (3) and (4) has a smaller overshoot for the same maneuver as compared to the cost function according to equations (1) and (2). A horizontal axis 302 indicates time, and a vertical axis 304 indicates the cross tracking error. Curve 306 results from using the cost function of equation (1), and curve 308 results from using the cost function of equations (3) and (4).

Figure 4:
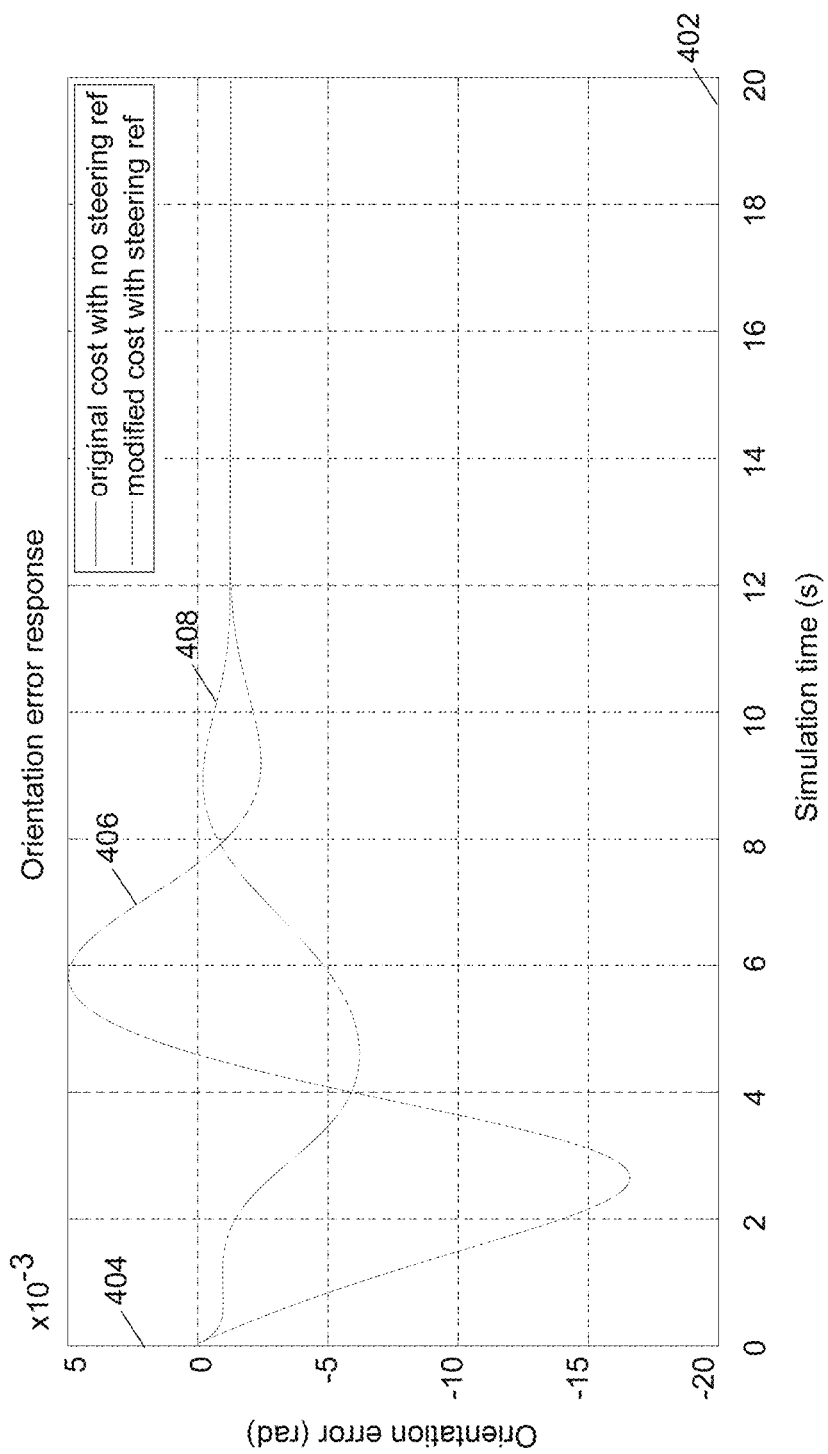
FIG. 4 an orientation error comparison between different cost functions.

FIG. 4 shows an illustration 400 of the difference in orientation errors. This may have a significant difference where the compensation of the error with the modified cost is far better than the conventional. A horizontal axis 402 indicates time, and a vertical axis 404 indicates the orientation error. Curve 406 results from using the cost function of equations (1) and (2), and curve 408 results from using the cost function of equations (3) and (4).

Figure 5:
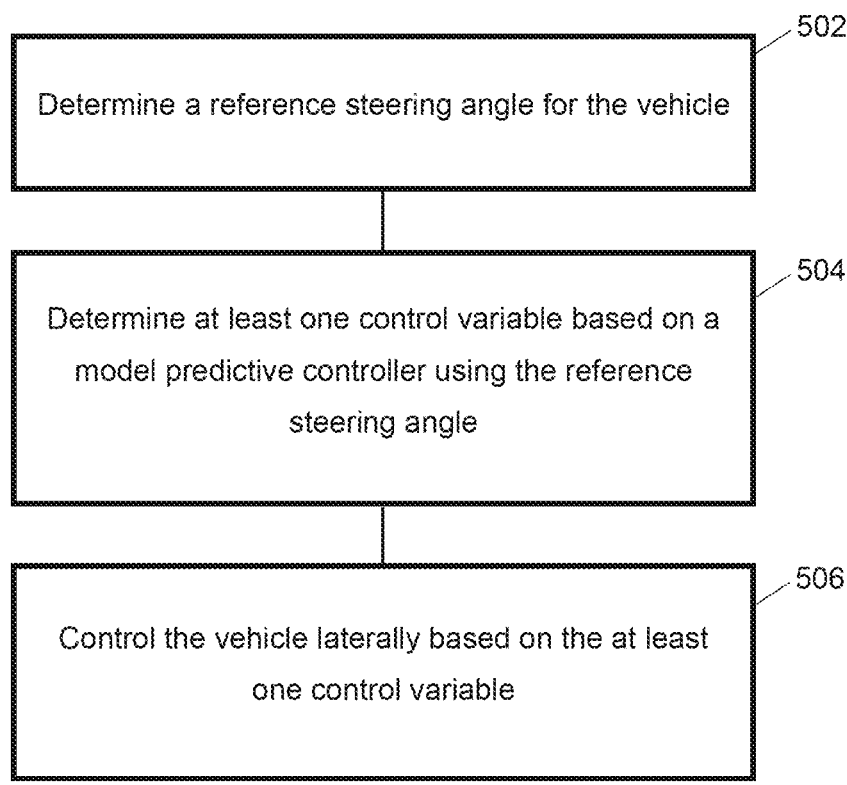
FIG. 5 a flow diagram illustrating a method for lateral control of a vehicle according to various embodiments.

FIG. 5 shows a flow diagram 500 illustrating a method for lateral control of a vehicle according to various embodiments. At 502, a reference steering angle for the vehicle may be determined. At 504, at least one control variable may be determined based on a model predictive controller using the reference steering angle. At 506, the vehicle may be controlled laterally based on the plurality of at least one control variable.

According to various embodiments, the reference steering angle may be based on a wheel base of the vehicle.

According to various embodiments, the reference steering angle may be based on a curvature of a road on which the vehicle is driving.

According to various embodiments, the reference steering angle may be based on a product of a wheel base of the vehicle and a curvature of a road on which the vehicle is driving.

According to various embodiments, the reference steering angle may be based on an understeer gradient.

According to various embodiments, the understeer gradient may be a constant for the vehicle.

According to various embodiments, the reference steering angle may be based on a lateral acceleration of the vehicle.

According to various embodiments, the reference steering angle may be based on a product of an understeer gradient and a lateral acceleration of the vehicle.

According to various embodiments, the reference steering angle may be based on sum of a first product and a second product, wherein the first product may be a product of a wheel base of the vehicle and a curvature of a road on which the vehicle is driving, and wherein the second product may be a product of an understeer gradient and a lateral acceleration of the vehicle.

According to various embodiments, the reference steering angle may be based on equation (3).

According to various embodiments, the model predictive controller is based on a cost function which is based on the reference steering angle and the at least one control variable (in other words: the cost function may be used as the cost function of a model predictive controller, wherein the model predictive controller is used to control the vehicle laterally).

According to various embodiments, the cost function may be based on equation (4).

Each of the steps 502, 504, 506, and the further steps described above may be performed by computer hardware components.

Figure 6:
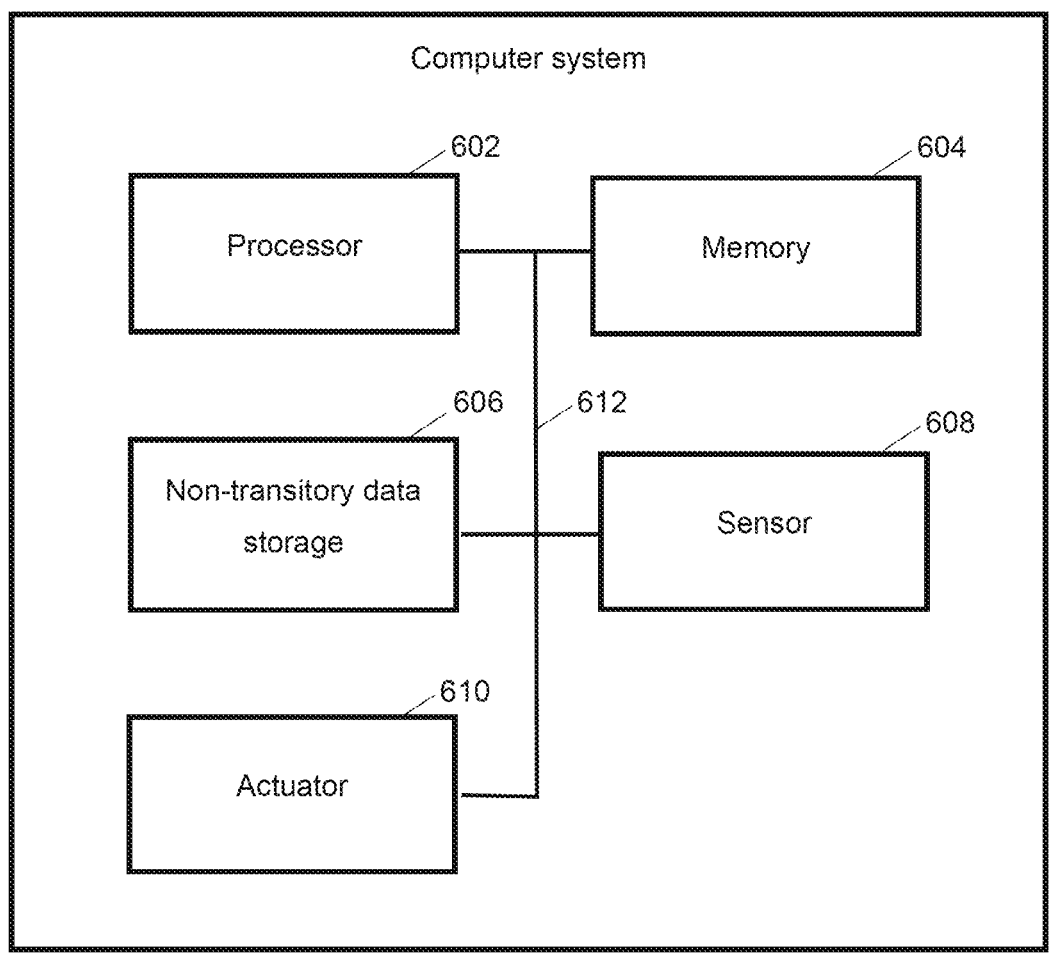
FIG. 6 a computer system with a plurality of computer hardware components configured to carry out steps of a computer implemented method for lateral control of a vehicle according to various embodiments.

FIG. 6 shows a computer system 600 with a plurality of computer hardware components configured to carry out steps of a computer implemented method for lateral control of a vehicle according to various embodiments. The computer system 600 may include a processor 602, a memory 604, and a non-transitory data storage 606. A sensor 608 and an actuator 610 may be provided as part of the computer system 600 (like illustrated in FIG. 6), or may be provided external to the computer system 600.

The processor 602 may carry out instructions provided in the memory 604. The non-transitory data storage 606 may store a computer program, including the instructions that may be transferred to the memory 604 and then executed by the processor 602. The sensor 608 may be used for determining an actual steering angle. The actuator 610 may be used for steering the vehicle based on the at least one control variable and the actual steering angle.

The processor 602, the memory 604, and the non-transitory data storage 606 may be coupled with each other, e.g. via an electrical connection 612, such as e.g. a cable or a computer bus or via any other suitable electrical connection to exchange electrical signals. The sensor 608 may be coupled to the computer system 600, for example via an external interface, or may be provided as parts of the computer system (in other words: internal to the computer system, for example coupled via the electrical connection 612).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the computer system 600.

The use of "example," "advantageous," and grammatically related terms means "serving as an example, instance, or illustration," and not "preferred" or "advantageous over other examples." Items represented in the accompanying figures and terms discussed herein may be indicative of one or more items or terms, and thus reference may be made interchangeably to single or plural forms of the items and terms in this written description. The use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"), unless the context clearly dictates otherwise. Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c, or any other ordering of a, b, and c).

REFERENCE NUMERAL LIST 100 model predictive controller according to various embodiments
102 time axis
104 past time
106 future time
108 desired set-point
110 measured states
112 closed-loop input
114 re-measured state
116 predicted states
118 optimal input trajectory
120 re-predicted state
122 re-optimal input trajectory
124 receding horizon
126 prediction horizon
128 receding horizon
130 prediction horizon
200 steering response comparison between different cost functions
202 horizontal axis
204 vertical axis
206 curve
208 curve
300 cross tracking error comparison between different cost functions
302 horizontal axis
304 vertical axis
306 curve
308 curve
400 orientation error comparison between different cost functions
402 horizontal axis
404 vertical axis
406 curve
408 curve
500 flow diagram illustrating a method for lateral control of a vehicle according to various embodiments
502 step of determining a reference steering angle for the vehicle
504 step of determining at least one control variable based on a model predictive controller using the reference steering angle
506 step of laterally controlling the vehicle based on the at least one control variable
600 computer system according to various embodiments
602 processor
604 memory
606 non-transitory data storage
608 sensor
610 actuator
612 connection

What is claimed is:

1. A computer implemented method comprising:
   determining a reference steering angle for a vehicle based on sum of a first product and a second product, the first product being a product of a wheel base of the vehicle and a curvature of a road on which the vehicle is driving, and the second product being a product of an understeer gradient and a lateral acceleration of the vehicle;
   determining at least one control variable based on a model predictive controller using the reference steering angle, the model predictive controller being based on a cost function that is based on the reference steering angle and the at least one control variable; and
   laterally controlling the vehicle based on the at least one control variable.

2. The computer implemented method of claim 1, wherein the understeer gradient is a constant for the vehicle.

3. The computer implemented method of claim 1, wherein the reference steering angle is based on the equation:

$$\delta_{ref}=L*K+K_v*a_y,$$

where:
- $\delta_{ref}$ represents a steering value for steady state cornering,
- Z represents the wheel base of the vehicle,
- x represents the curvature of the road on which the vehicle is driving,
- $K_v$ is the understeer gradient, and
- $a_y$ represents the lateral acceleration of the vehicle.

4. A computer system comprising computer hardware components configured to:
- determine a reference steering angle for a vehicle based on sum of a first product and a second product, the first product being a product of a wheel base of the vehicle and a curvature of a road on which the vehicle is driving, and the second product being a product of an understeer gradient and a lateral acceleration of the vehicle;
- determine at least one control variable based on a model predictive controller using the reference steering angle, the model predictive controller being based on a cost function that is based on the reference steering angle and the at least one control variable; and
- laterally control the vehicle based on the at least one control variable.

5. The computer system of claim 4, further comprising:
- a sensor configured to determine an actual steering angle; and
- an actuator configured to steer the vehicle based on the at least one control variable and the actual steering angle.

6. The computer system of claim 5, wherein the sensor comprises at least one of an angular sensor, a camera, a gyroscope, or an accelerometer.

7. The computer system of claim 4, further comprising: the vehicle.

8. A non-transitory computer readable medium comprising instructions that when executed configure computer hardware components to:
- determine a reference steering angle for a vehicle based on sum of a first product and a second product, the first product being a product of a wheel base of the vehicle and a curvature of a road on which the vehicle is driving, and the second product being a product of an understeer gradient and a lateral acceleration of the vehicle;
- determine at least one control variable based on a model predictive controller using the reference steering angle, the model predictive controller being based on a cost function that is based on the reference steering angle and the at least one control variable; and
- laterally control the vehicle based on the at least one control variable.

* * * * *

UNITED STATES PATENT AND TRADEMARK OFFICE
CERTIFICATE OF CORRECTION

PATENT NO. : 12,397,787 B2
APPLICATION NO. : 18/162146
DATED : August 26, 2025
INVENTOR(S) : Seyed Amin Alamdari Sajadi et al.

It is certified that error appears in the above-identified patent and that said Letters Patent is hereby corrected as shown below:

On the Title Page

Item (72) Inventors; Line 2: Delete "Vijay Kumar," and insert --Vijaykumar,-- therefor In the Claims Column 9, Lines 3-4: In Claim 3, delete "$\delta_{ref} = L * K + K_v * a_y$--" and insert --$\delta_{ref} = L * \kappa + K_v * a_y$-- therefor Column 9, Line 8: In Claim 3, delete "Z" and insert --L-- therefor Column 9, Line 9: In Claim 3, delete "x" and insert --$\kappa$-- therefor Signed and Sealed this
Thirtieth Day of December, 2025

John A. Squires
*Director of the United States Patent and Trademark Office*